United States Patent [19]

Alter

[11] Patent Number: 5,600,836
[45] Date of Patent: Feb. 4, 1997

[54] SYSTEM AND METHOD FOR PROCESSING DATE-DEPENDENT INFORMATION WHICH SPANS ONE OR TWO CENTURIES

[75] Inventor: Harvey Alter, Ambler, Pa.

[73] Assignee: Turn of the Century Solution, Inc., Wayne, Pa.

[21] Appl. No.: 557,457

[22] Filed: Nov. 14, 1995

[51] Int. Cl.$^6$ .................................................. G06F 17/30
[52] U.S. Cl. ........................................... 395/612; 368/231
[58] Field of Search ............................. 345/600; 368/231

[56] References Cited

PUBLICATIONS http://www.year 2000.com/believeme.html; Oct. 2, 1996, pp. 1–2.
http://www.sicor.com/year 2000/approach.html; Oct. 4, 1996, pp. 1–2.
http://solutions 2000.com/index.html; Oct. 2, 1996, pp. 1–2.
"The Fifth Millennial Maintenance Conference;" Sep. 22, 1995, Baltimore/Washington International Airport—presentation by Paul O'Neil of Raytheon Company, (Bedford, MA).

*Primary Examiner*—Thomas G. Black
*Assistant Examiner*—Paul R. Lintz
*Attorney, Agent, or Firm*—Woodcock Washburn Kurtz Mackiewicz & Norris

[57] ABSTRACT

The invention provides a system and method for processing date-dependent information in two-digit format where the dates are in one or two centuries. The system according to the invention includes time change interfaces that convert date data from local time to zone time so that all of the dates are in one century. An application processes the date data in zone time instead of local time. The date data output from the application after processing is represented in zone time and therefore is converted by a time change interface from zone time to local time. According to the inventive method, the two-digit years provided as inputs to the application are adjusted by either a time change value or a complement value. The time change value is the difference in years between local time and zone time. The complement value is the difference between one hundred years and the time change value. The output date data generated by the application is then similarly adjusted by either the time change value or the complement value so that the output dates are accurately represented in local time. Where the application has a master data file, the date data in the master data file is converted in advance to zone time.

20 Claims, 12 Drawing Sheets

SYSTEM AND METHOD FOR PROCESSING DATE-DEPENDENT INFORMATION WHICH SPANS ONE OR TWO CENTURIES

FIELD OF THE INVENTION

This application claims the benefit of U.S. provisional application No. 60/007,164, filed Nov. 1, 1995.

The present invention relates to a system and method for processing date-dependent information in which the years are specified in a two-digit format and span more than one century. More particularly, the present invention relates to a system and method for processing date-dependent information in accordance with existing applications when the date-dependent information bridges more than one century.

BACKGROUND OF THE INVENTION

Due to the high cost of memory in early computing systems or for convenience, date information has been and is still, stored in two-digit year formats. Information processing systems such as those used for accounting, inventory, and insurance, include numerous records containing date-related information. Large entities often design and maintain their own information processing systems, while smaller entities may purchase off-the-shelf software to perform their information processing. As the turn of the century approaches (defined herein as the year 2000), the information processing world is seeking solutions to avoid catastrophic failures that will result from existing applications that process date-dependent information with two-digit year formats.

Solutions have been suggested to combat the turn-of-the century problem. However, most of these solutions involve the conversion of all two-digit years to four-digit years. The drawbacks associated with such solutions are numerous. For example, all of the date fields in existing databases and flat files would require reformatting. Data definitions and internal work areas in application programs would also require reformatting. Similarly, all date-handling routines utilized by the application programs would need to be rewritten to accommodate four-digit year data. Thus most of the existing applications, whether custom designed or off-the-shelf will require substantial file reformatting and rewriting of routines at great expense in terms of cost and time. Moreover, those entities that rely on off-the-shelf products for information processing must rely on their vendors to implement such costly solutions before the turn of the century.

Consequently, a less onerous solution has been suggested in which the two-digit years are not converted to four-digit years. According to this solution, the application program code is modified so that each year that is read from the application's master file or other data files is reduced by 28 years. In this way all dates up to Dec. 31, 2027 are reduced back into the twentieth century and all of the date processing can occur in a single century. Once the program data is converted back in time and processed, the program data is increased by 28 years so that the resulting output dates reflect the actual or correct date.

A significant drawback associated with this solution is that it will still be necessary for a programmer to locate all of the points in the application program code where dates specified by the program data are input for processing or output after processing. At each of these points, code must be inserted to perform the date conversion. Thus each time the same date data is accessed it must be converted as program data by modified application code.

Accordingly, there still exists a need for a system and method for processing date-dependent data in a simple manner that does not require extensive programming changes to existing application software.

SUMMARY OF THE INVENTION

This need is fulfilled by the present invention by providing a system that processes date-dependent information in which the dates are specified in a two-digit format and are in at most two centuries. The system according to the invention includes a number of local data files having dates represented in local time, a number of zone data files having dates represented in zone time, and at least one time change interface between the local data files and the zone data files that converts the dates represented in local time to dates represented in zone time and converts the dates represented in zone time to dates represented in local time. The dates represented in zone time are processed by a selected application. The local data files comprise at least one external data file that is generated and modified by a source external to the selected application. The selected application comprises a master data file having dates represented in local time. The dates in the master file are preferably converted in advance from local time to zone time. In a preferred embodiment, the system further includes a zone switch interfaced to each of the time change interfaces and activates and deactivates the time change interfaces. In another preferred embodiment, the relative difference between the local time and the zone time is represented by a number of years that is a multiple integer of 4.

In an alternative embodiment, the system may include a source of on-line input date data and provide an output of on-line output date data generated by the application. The application may then include a time change interface to accept an input of the on-line input date data and to output on-line output date data. Such a time change interface according to this embodiment of the invention converts the dates represented in local time to dates represented in zone time and converts the dates represented in zone time to dates represented in local time.

The present invention also provides a method for processing date-dependent information including dates specified in a two-digit format and in at most two centuries. The steps according to the inventive method include converting input date data to be processed from local time to zone time, processing the zone input date data in accordance with a selected application to generate zone output date data, and converting the zone output date data into output date data represented in local time. In a preferred embodiment, the input date data comprises a number of input years and the step of converting the input date data from local time to zone time includes the steps of defining a time change indicative of a number of years to adjust the local time, and subtracting the time change from at least some of the input years to generate output years represented in zone time that are processed in accordance with the selected application. In a more preferred embodiment, this step also includes generating a complement value representing the difference between one hundred years and the time change, and adding the complement value to each input year that is less than the time change to generate an output year represented in zone time that is processed in accordance with the selected application. In this preferred embodiment, the zone output date data comprises a number of input years represented in zone time and the step of converting the zone output date data into output date data includes the steps of adding the time change to at least some of the input years represented in zone time to generate corresponding output years represented in local time, and subtracting the complement value from each input year represented in zone time that is not less than the complement value to generate a corresponding output year represented in local time.

Another aspect of the invention is that the system may be simply tested in accordance with the following steps. First a set of input test data comprising dates in one century is defined. Then the input test data is processed in accordance with the selected application while the invention is deactivated to generate output test data. The input test data is processed when the invention is activated to generate the output date data. The output test data and the output date data are then compared to verify that the output date data is identical to the output test data. When the output test data and the output date data are not identical the primary source of error is the time change interfaces. Accordingly, in most cases the error can be readily identified and corrected.

BRIEF DESCRIPTION OF THE DRAWINGS

The present invention will be better understood, and its numerous objects and advantages will become apparent by reference to the following detailed description of the invention when taken in conjunction with the following drawings, in which.

DETAILED DESCRIPTION OF THE INVENTION

The invention will now be described in connection with FIGS. 1–11 in which like reference numerals in the Figures refer to like elements.

Figure 1:
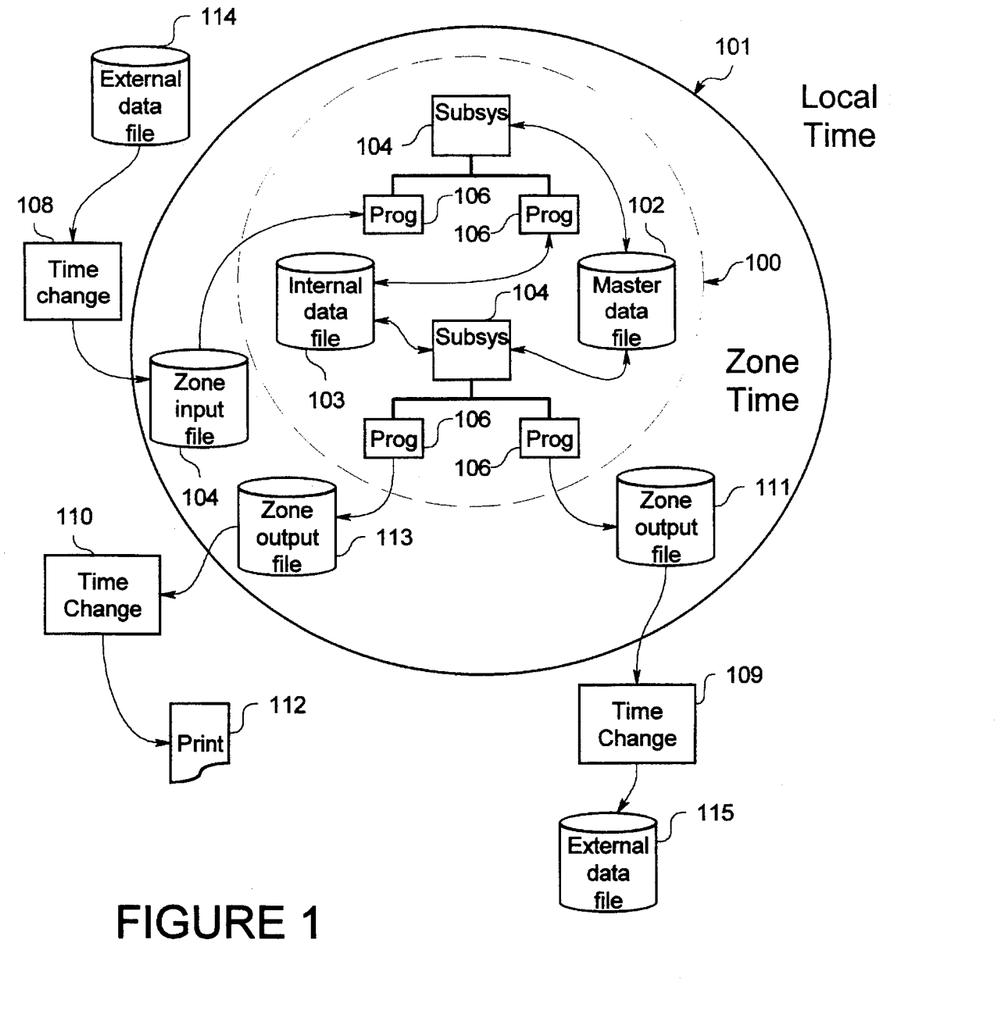
FIG. 1 shows one implementation of the system according to the invention in connection with a batch processing application.

FIG. 1 shows one implementation of the system according to the invention in connection with a batch processing application. The application 100 comprises a master data file 102 and subsystems 104. Each subsystem includes a plurality of programs 106. The application 100 may include other internal data files 103. The application may receive input data from one or more external sources such as operating system data or data files generated by other applications. This data is shown in FIG. 1 as the external data file 114. The application may also output data to an external data file 115 that can be accessed by other applications or by users. Data may also be output from the application to a printer 112.

In accordance with the present invention, all date data is preferably converted prior to processing by the application so that the years are confined to a single century. Once the date data has been converted the dates are said to be represented in zone time. The actual or true date data, prior to conversion, is represented in local time. A time boundary 101 depicts the division of the programs and files that reference dates in zone time and those that reference dates in local time. Time change interfaces 108, 109, and 110 are provided to convert date data between local time and zone time. Specifically a time change value (Year.change) is preselected and is used to adjust all of the year fields in external data files represented in local time to zone time and to convert year fields output from the application in zone time to local time. Details concerning the selection of a value for Year.change are provided below.

As shown in FIG. 1, time change interface 108 converts the date data from external data file 114 and outputs the converted date data into zone input data file 104. Application 100 outputs date data into zone output data files 111, 113 and time change interfaces 109, 110, respectively convert the date data from zone time to local time. The converted output data is then stored in external data file 115 or printed from printer 112, respectively. Thus, some of the files external to application 100 are local data files (e.g., external data files 114, 115) while others are zone data files (e.g., zone input file 104 and zone output files 111, 113). As shown in FIG. 1, the application files (e.g., the master data file 102 and the internal data file 103) are likewise zone data files in accordance with the invention.

Figure 2:
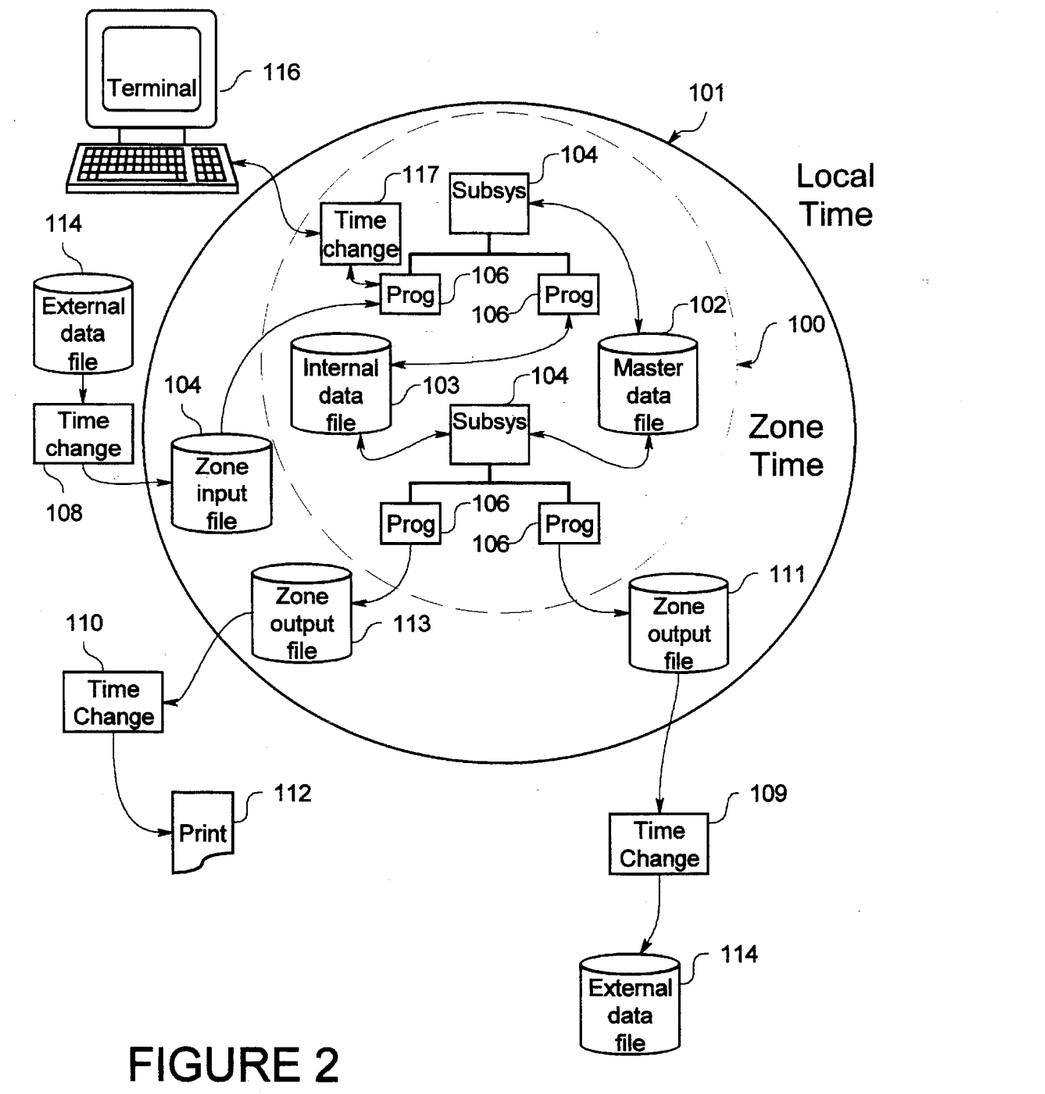
FIG. 2 shows one implementation of the invention in connection with on-line application processing.

FIG. 2 shows a second implementation of the invention in connection with on-line application processing. Because on-line data is difficult to capture between the source of the data, i.e. terminal 116, and the application, it is preferable to modify the application to include a time change interface 117. In the embodiment shown in FIG. 2, the time change interface 117 is adapted to convert the on-line date data from local time to zone time and to also convert the date data to be output from the application to the terminal from zone time to local time.

It should be understood that any of the time change interfaces shown in FIGS. 1 and 2 may be adapted to convert from local time to zone time and from zone time to local time. Moreover, it should also be understood that a different number of time change interfaces could be used so that data files share a single time change interface.

Figure 3A:
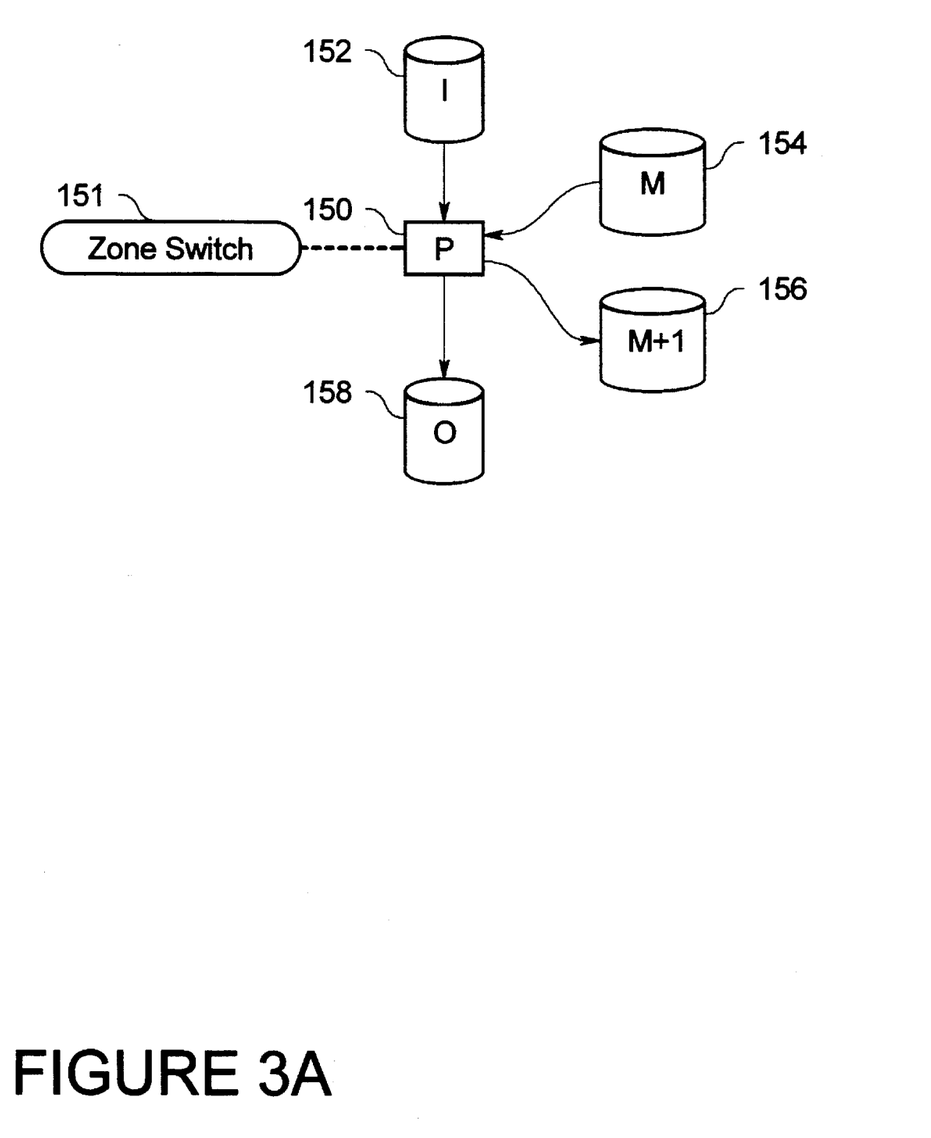
FIG. 3A shows an interface diagram for an application processing date data in which the invention has been deactivated.

The method that is carried out by the invention will now be described in further detail with reference to FIGS. 3A and 3B. FIG. 3A shows an interface diagram for an application processing date data in which the invention has been deactivated. In a preferred embodiment, a zone switch 151 is provided that is capable of deactivating the invention, for example, when all of the dates in local time are in one century. The switch may be implemented using a number of different techniques such as by defining a job parameter or by writing conditional code into the time change interfaces. It should be understood that in many mainframe applications, the switch may be tested for activation/deactivation definition at the operating system level rather than the program level. Therefore, the dashed lines between the switch 151 and the various programs or procedures shown in FIGS. 3A and 3B represent a functional interface in such systems rather than an actual interface.

The application program code (P) 150 reads input data from input data file (I) 152. The data from the application master data file (M) 154 is modified by P based on data from I. The modified data may be stored in an updated master data file (M+1) 156. Output data generated by P is output from the application and may be written to output data file (O) 158. Assuming the zone switch 151 is deactivated, no conversion between local time and zone time is carried out in accordance with a preferred embodiment of the invention.

Figure 3B:
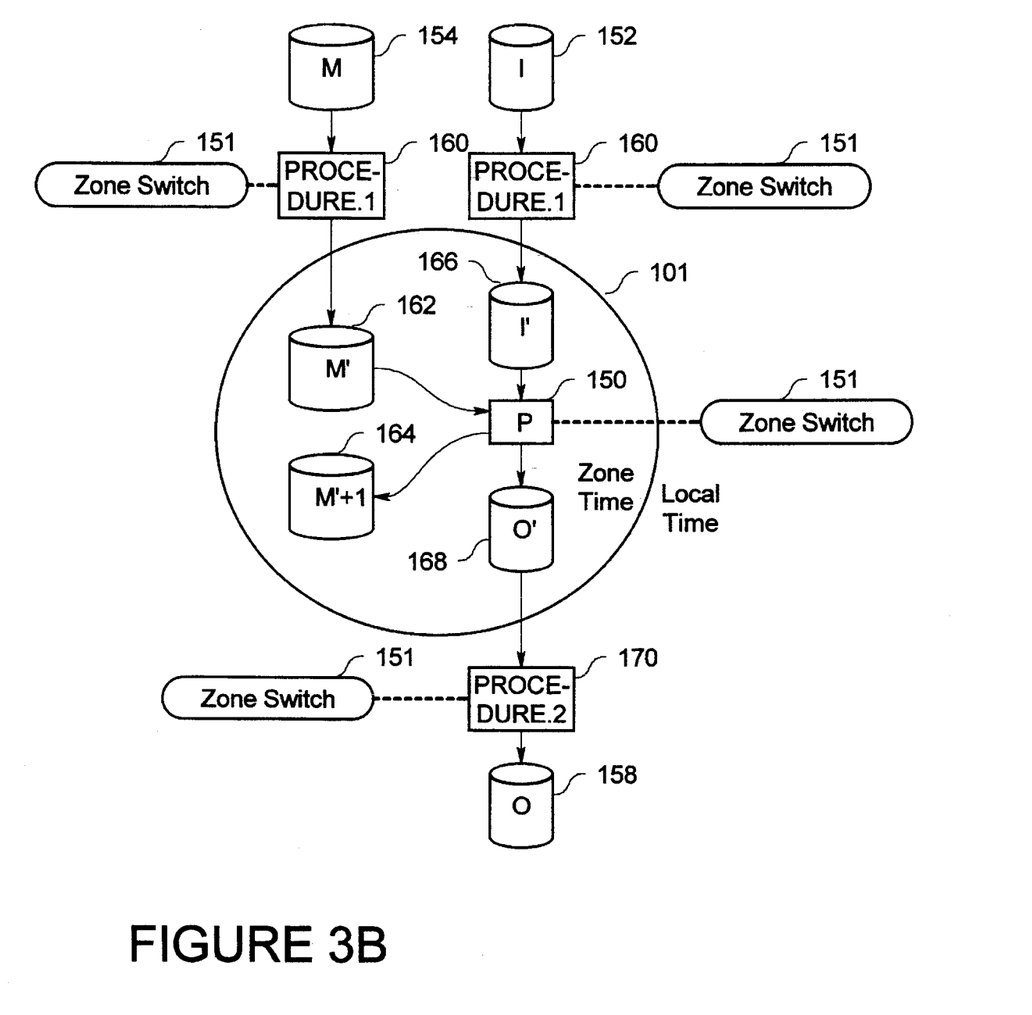
FIG. 3B shows an interface diagram for an application processing date data in which the invention has been activated.

FIG. 3B shows an interface diagram for an application processing date data in which the invention is activated by zone switch 151. When zone switch 151 is activated, PROCEDURE.1 at 160 and PROCEDURE.2 at 170 are executed in accordance with the present invention. PROCEDURE.1 is used to convert date data stored in M from local time to zone time. The converted M date data is stored in a zone master data file (M') 162. PROCEDURE.1 is also executed to convert date data retrieved from I from local time to zone time. The converted I date data is stored in a zone input data file (I') 166. Based on the date data from I', the application modifies the data stored in M' and stores the modified zone data in an updated zone master data file (M'+1) 164. The application P generates zone output data and writes this data to zone output file (O') 168. PROCEDURE.2 converts the zone date data from O' from zone time to local time to generate output date data that is written to output data file (O) 158.

Figure 4:
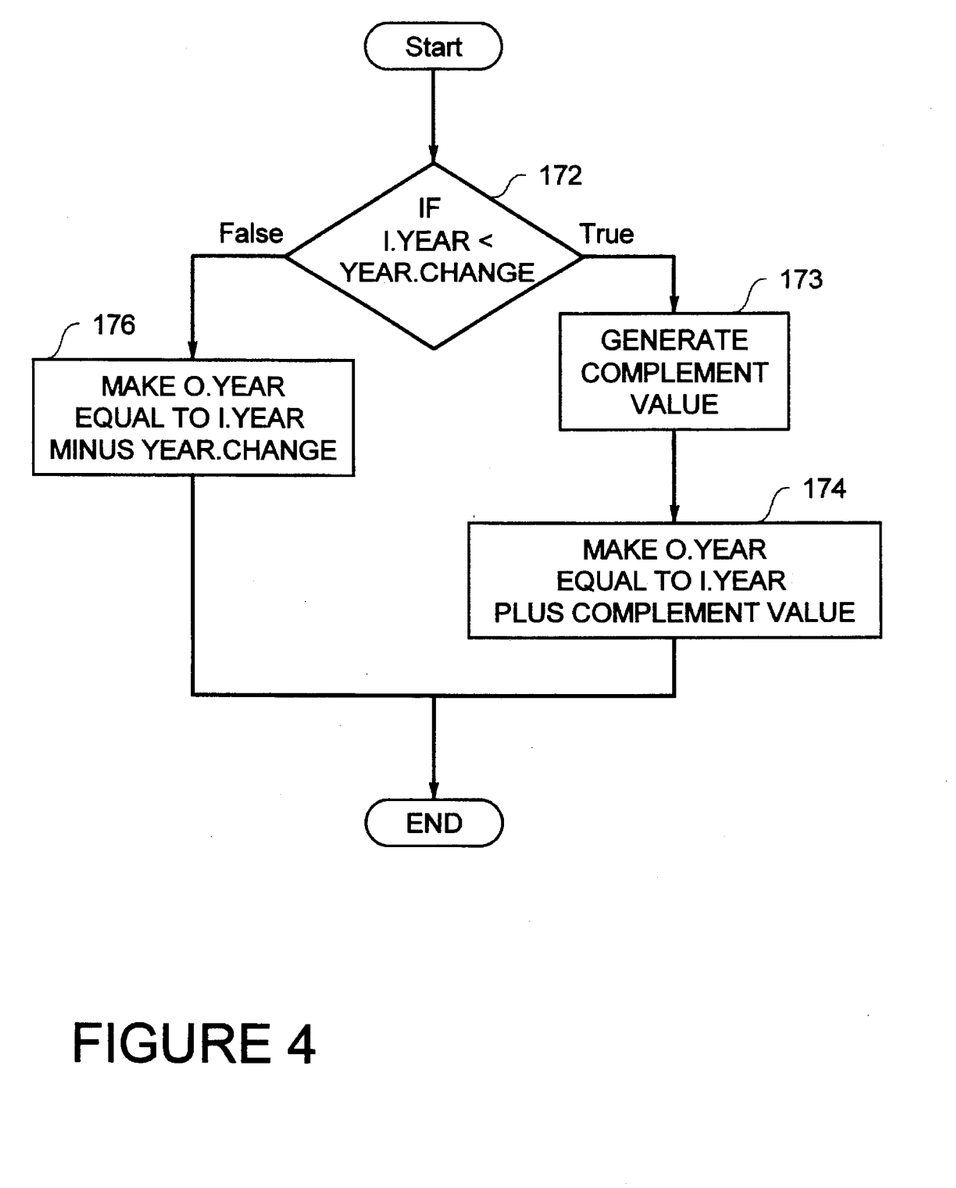
FIG. 4 shows a diagram of the steps carried out by PROCEDURE.1 in accordance with a preferred embodiment of the present invention.

FIG. 4 shows a flow diagram of the steps carried out by PROCEDURE.1. The first step in the procedure shown at 172 compares each input year (I.year) retrieved from I or M with the value of year.change. Hence, if year.change is selected to be 20, then all years from 2000 up to and including 2019 are identified by step 172. Recall that year.change is the year value used to adjust all the year fields in substantially all files that are accessed by the application. The actual value that is selected is discussed in more detail below.

If the input year is less than year.change as shown at 172 a complement value is generated at 173. The complement value is the difference between 100, the number of years in a century, and the value of year.change. Thus considering the example in which year.change is 20, the complement value would be 80. The next step at 174 is to add the complement value to the input year thereby generating the output year (O.year) which is the year to be included in the zone input file I' or the zone master data file M'. According to the example, all years between 2000 and 2019 (i.e., in two-digit format 00, 01, 02, etc.) are reduced to years between 1980 and 1999 (i.e., in two-digit format 80, 81, 82, etc.) respectively. If the input year is not less than year.change the output year (O.year), the year to be stored in I' or M', is generated by subtracting year.change from I.year. Thus where year.change is 20, years prior to 2000 are reduced by 20 years.

Figure 5:
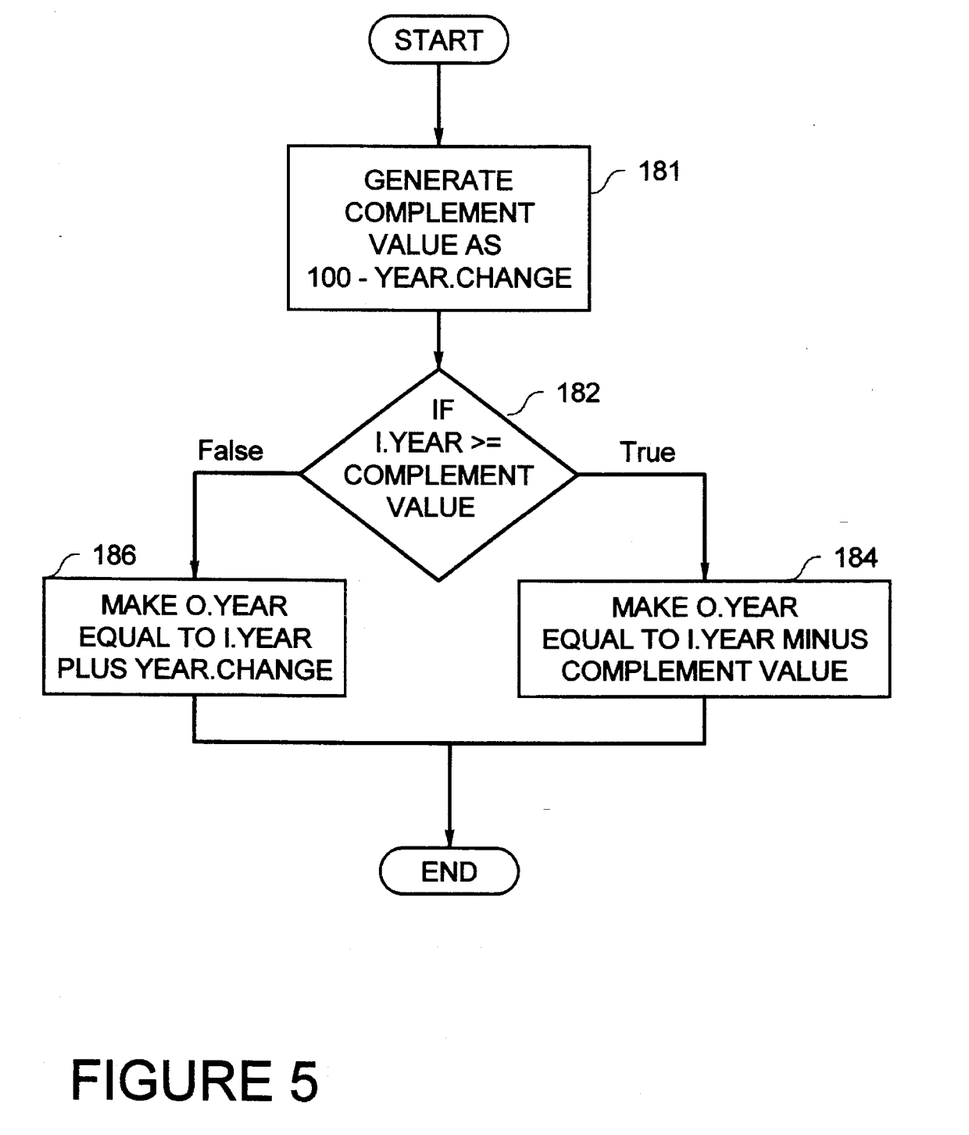
FIG. 5 shows a flow diagram of the steps carried out by PROCEDURE.2 in accordance with a preferred embodiment of the present invention.

FIG. 5 shows a flow diagram of the steps carried out by PROCEDURE.2. The first step in the procedure is to generate the complement value as shown at 181. Since the complement value should be the same value that was generated in PROCEDURE.1, the complement value may be retrieved from a commonly accessible memory location rather than regenerated. The next step is to determine whether or not the input year (I.year) retrieved from O' is greater than or equal to the complement value as shown at 182. If the input year is less than the complement value then the output year (O.year) to be stored in O is generated by adding year.change to the input year. If the input year, however, is greater than or equal to the complement value then the output year is generated by subtracting the complement value from the input year. Again considering the example in which year.change is set to 20, the complement value is 80. Thus all zone output dates that are 1980 or later (in two-digit format 80, 81, 82, etc.) are adjusted to local time by subtracting 80 (in corresponding two-digit format 00, 01, 02, etc.) to accurately provide output dates in the twenty first century.

Figure 6:
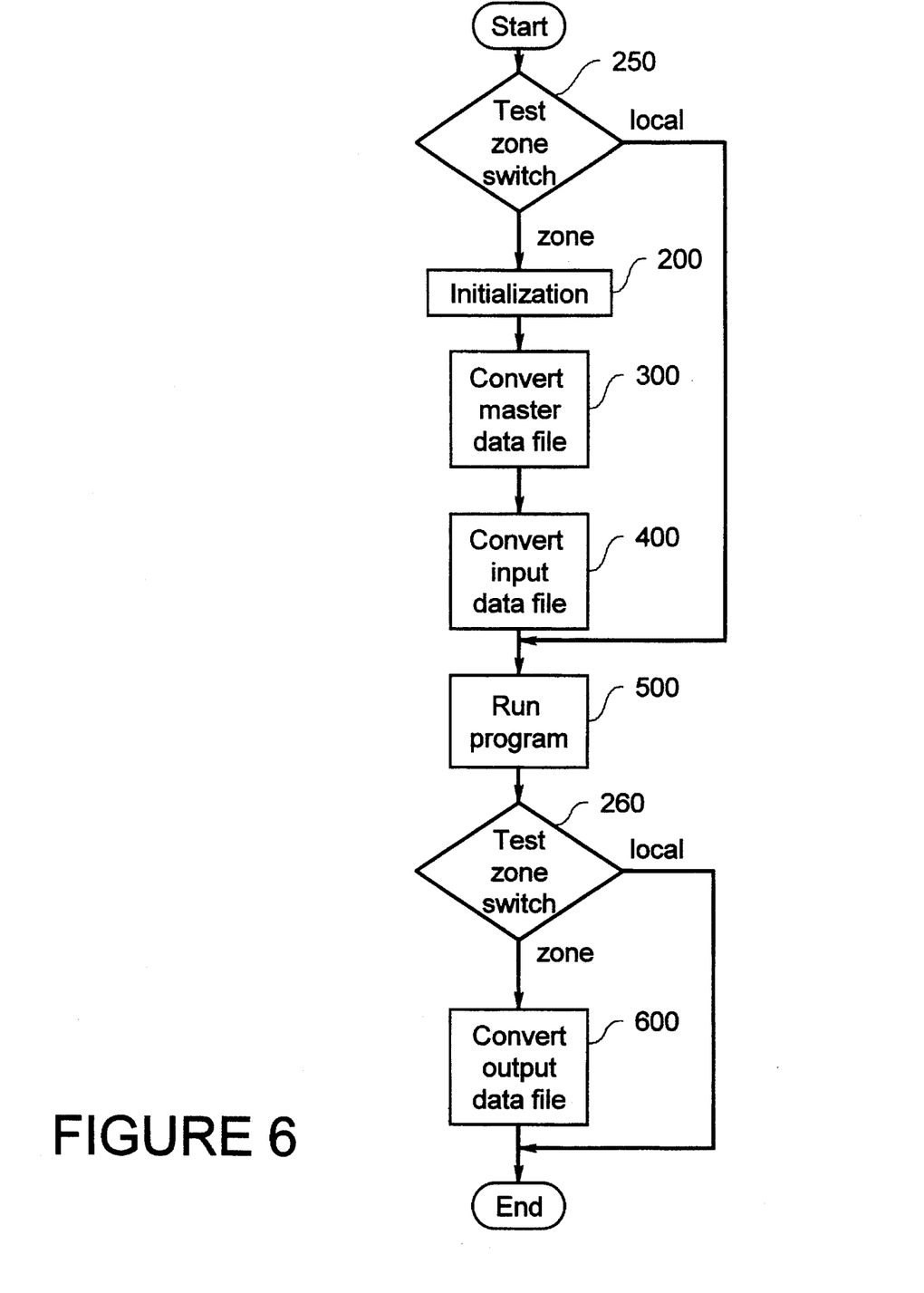
FIG. 6 shows a flow diagram of the overall process implemented according to a preferred embodiment of the present invention.

FIG. 6 shows a flow diagram of the overall process implemented according to a preferred embodiment of the present invention. The zone switch which was discussed above in connection with FIGS. 3A and 3B is tested at step 250 to determine whether the switch is activated or deactivated. If the switch is deactivated the application program is run at step 500. The switch is then tested again at step 260. Since the switch is deactivated, the process exits and all of the date data is processed in local time as also shown in FIG. 3A.

However, when the switch is activated as determined at step 250, a general initialization procedure is carried out at 200. The master data file M is then converted at step 300 followed by the conversion of the input data file I at step 400. It should be understood that the master data file may only require conversion according to step 300 one time, but the step of converting I, may be repeated over and over again with each new or distinct input data file I and for each periodic execution of the application.

The zone master data file M' is then modified according to the selected application at step 500. The final step in the overall process according to a preferred embodiment of the invention is to convert the zone output date data from O' to output date data that is written to O at step 600.

Figure 7:
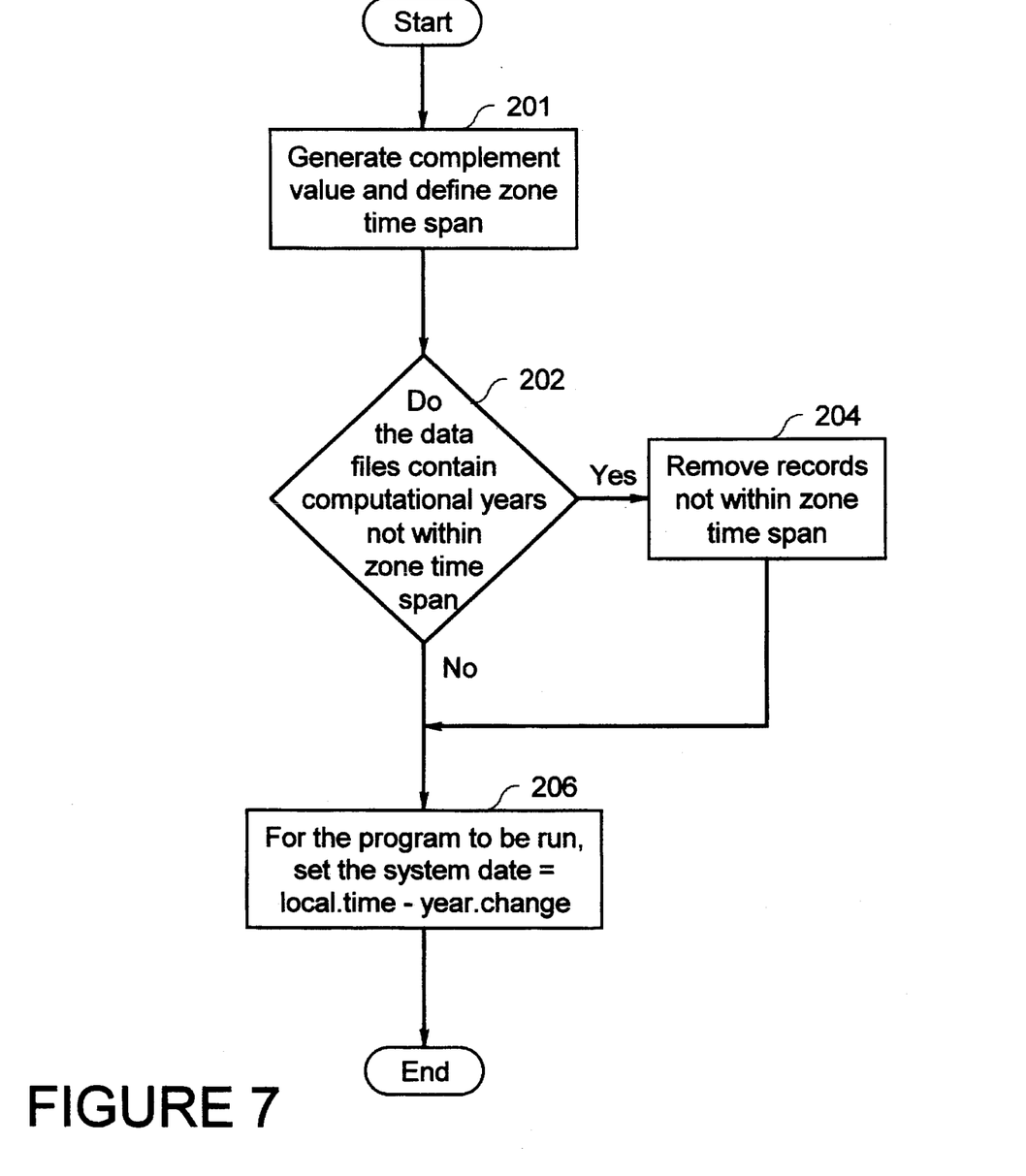
FIG. 7 shows a detailed flow diagram of the initialization process according to an embodiment of the present invention.

FIG. 7 shows a detailed flow diagram of the initialization process shown at step 200 in FIG. 6. In a preferred embodiment, the initialization process, among other things, removes records that are not handled according to PROCEDURE.1 and PROCEDURE.2. Such records include input date data having years that fall outside of the zone time span. The zone time span has a total length equal to the number years in a century (100 years) and begins with the year 1900 plus the year.change. Thus if year.change is 20 the zone time span includes all dates between Jan. 1, 1920 through Dec. 31, 2019. (Note that in actual practice because 1900 is not a leap year, zone time span should be reduced to 99 years and the beginning year increased by one.) According to a preferred embodiment, PROCEDURE.1 is adapted to convert years represented in local time within the zone time span and PROCEDURE.2 is adapted to convert years represented in zone time to years within the zone time span. Some of the input years may be computational years, i.e., fields used in arithmetic or comparison operations, and others may be purely informational years, i.e., fields not used in arithmetic or comparison operations. It should be understood, that for purposes of processing input years with two-digit year formats after the turn of the century, only computational years must be converted in accordance with the present invention. However, to avoid the labor of having to distinguish between computational and informational years through tedious program analysis, all years are preferably converted.

Thus the first step in the initialization process shown in FIG. 7 is to generate the complement value and define the zone time span as shown at step 201. The next step in the process is to determine whether or not any date data in any of the input data files (I) or master data files (M) to be accessed by the application contain any dates with computational years that are not within the zone time span as shown at 202. If there are computational years that are identified as being outside the zone time span, then those data records related to the identified computational years are removed from I and M, and are not processed in accordance with the invention as shown at step 204.

Once those records are removed or if no computational years outside the zone time span have been identified, then the system date is set to a zone date by subtracting year.change from local time as shown at step 206. It should be understood that in the event that any of the steps of the application program call for a system date, the system date must also be converted when the invention is activated. The system date conversion may be provided by a separate procedure or a known utility can be used to convert the system date to the selected date at step 206. Such known software includes HOURGLASS 2000 available from Mainware, Inc. and PORTAL 2000, available from Prince Software, Inc.

Figure 8:
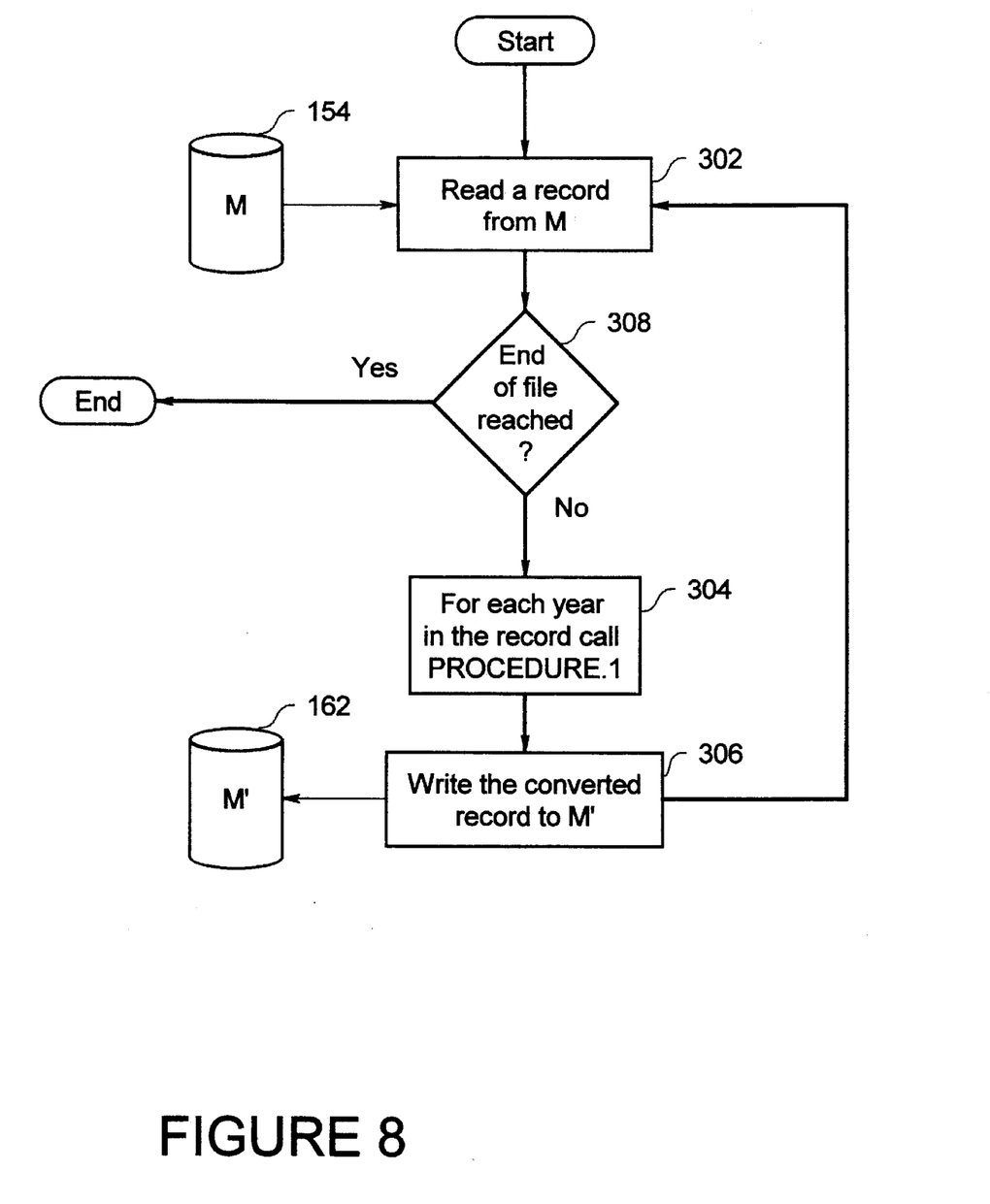
FIG. 8 shows a detailed flow diagram of the master data file conversion process according to an embodiment of the present invention.

FIG. 8 shows a detailed flow diagram of the steps carried out in connection with the master data file conversion process shown at step 300 in FIG. 6. The master data file (M) at 154 is read to retrieve a record from that file as shown at step 302. When no more records exist in M to be read, as determined at step 308, the master data file conversion is complete. For each input year in the retrieved record, PROCEDURE.1 is called at step 304. Recall that PROCEDURE.1 converts the date data in the master data file to zone time in accordance with the steps shown in FIG. 4. Once the input year has been converted to zone time the record is written to the zone master data file M' as shown at 162.

Figure 9:
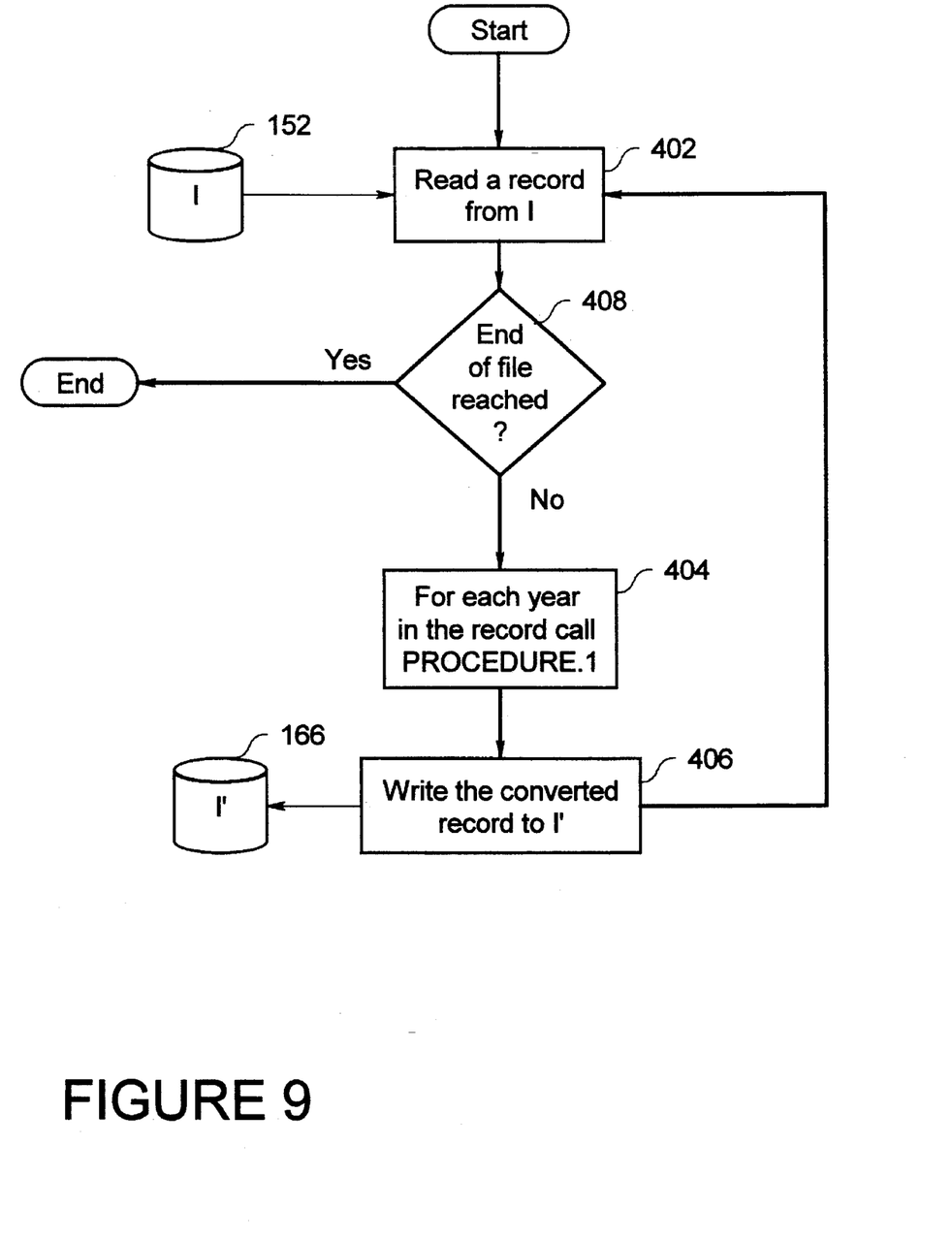
FIG. 9 shows a detailed flow diagram of the input date data conversion process according to an embodiment of the present invention.

FIG. 9 shows a detailed flow chart of the input data file conversion process shown at step 400 in FIG. 6. A single record is read from the input data file (I) 152 as shown at step 402. Once each record has been read and converted as determined in step 408, the input data file conversion for a particular input data file (I) is complete. For each input year in the retrieved record, PROCEDURE.1 is called at step 404 to convert the input years represented in local time to zone time. The converted date data is then written at step 406 into the zone input file (I') 166.

Figure 10:
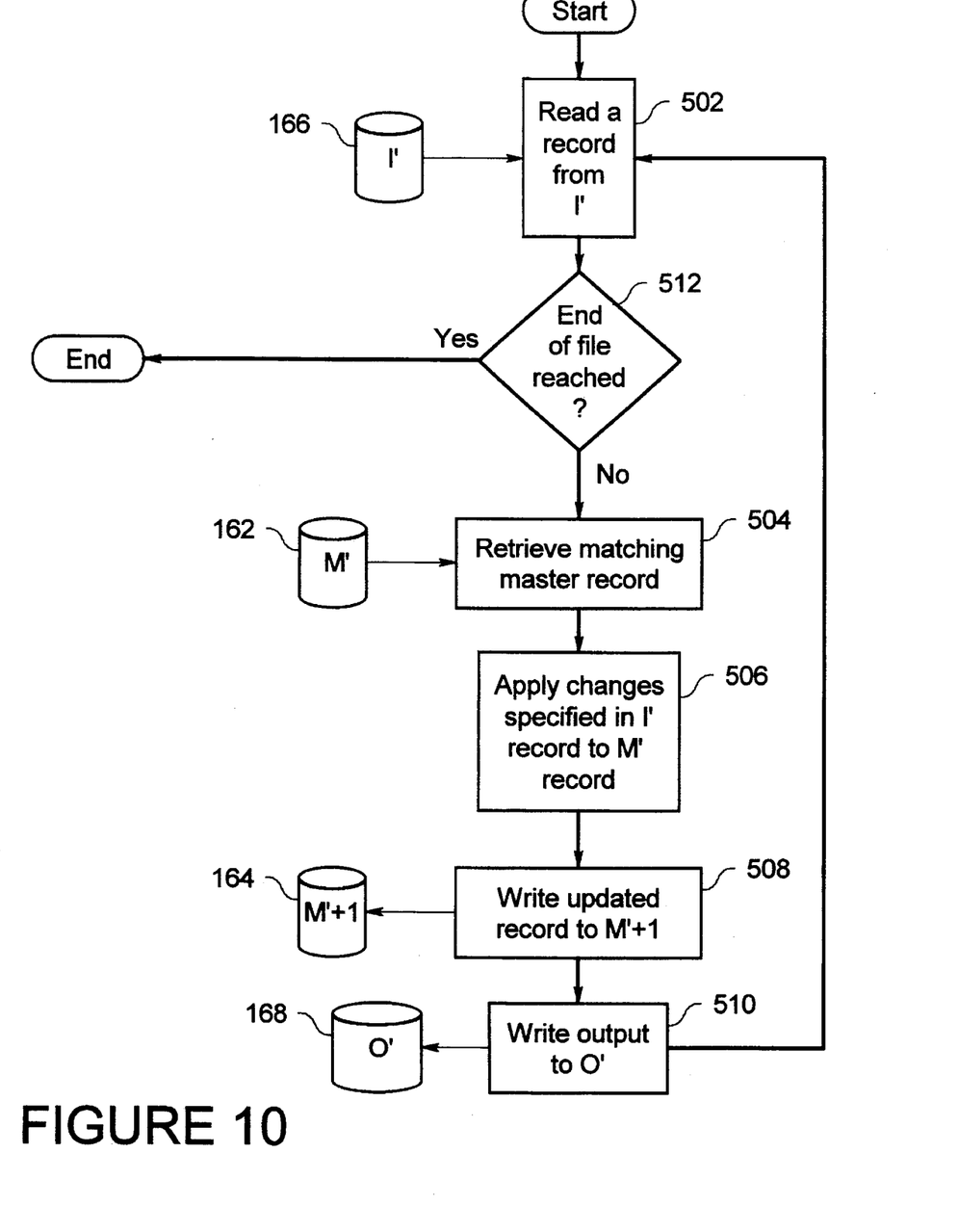
FIG. 10 shows a detailed flow diagram of the program execution step.

FIG. 10 shows a detailed flow diagram of the program execution step 500 shown in FIG. 6. A record is read from I' 166 as shown at step 502. Once each of the records has been read and processed in accordance with steps 502 through 510 as determined at step 512 the program may be exited. A corresponding master record is retrieved at step 504 from M' 162 and the master data is modified as specified by the data associated with the record retrieved from I' at step 506. The updated master data is then written to the zone master data file at step 508 which, as modified, is referred to as the updated zone master data file (M'+1) 164. The zone output data is then written to the zone output file (O') 168 as shown at step 510.

Figure 11:
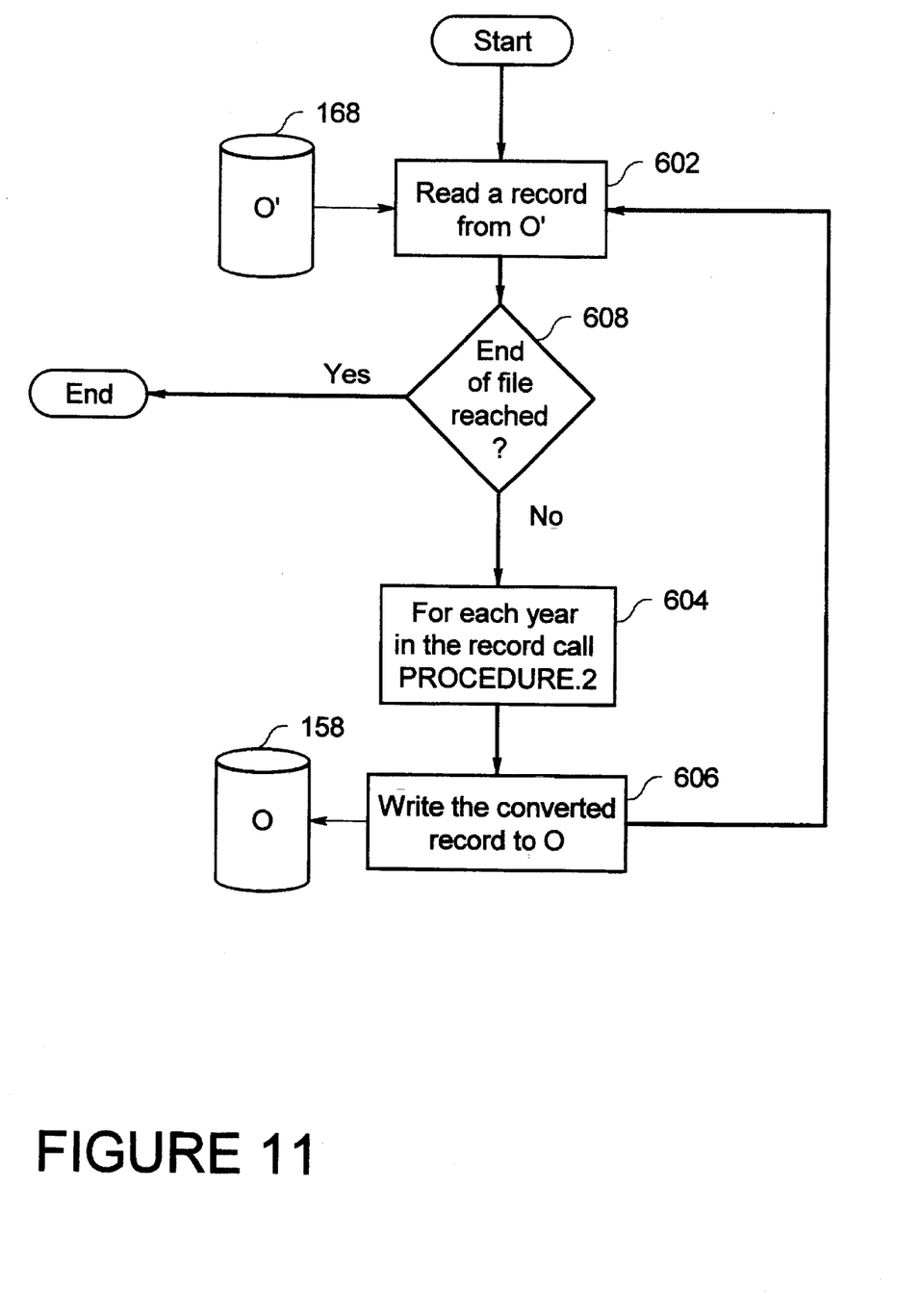
FIG. 11 shows a detailed flow diagram of the zone output data conversion process according to an embodiment of the present invention.

FIG. 11 shows a detailed flow diagram of the zone output data conversion process shown at step 600 in FIG. 6. A record is read from O' 168 as shown at step 602. Once each of the records in O' has been read and processed in accordance with steps 602, 604, and 606 as determined by step 608 the output file conversion process is complete. For each year in the record, PROCEDURE.2 is called to convert the year represented in zone time to local time in accordance with the steps shown in detail in FIG. 5. Once the date data is converted, the output date data is written to output data file (O) 158 at step 606.

As mentioned above, a value is preselected for the value assigned to year.change. The selection of the value may depend on many factors and may differ from system-to-system and from application-to-application. In a preferred embodiment, the value of year.change is selected as a multiple integer of 4. However, the invention is not intended to be limited thereto. A value that is an integer multiple of 4 will permit an application to continue processing date-dependent information with existing routines for handling leap years. For example, the year 2000 is a leap year and accordingly includes an extra day in February. If the value of year.change is 20, an integer multiple of 4, the year 2000 is represented in zone time as 80 (corresponding to 1980) which was also a leap year. Moreover, if a multiple of 28 years is used, then the days of the week will also remain the same between dates represented in local time and those represented in zone time.

Another consideration in selecting the value of year.change is the desired zone time span. If year.change is 20, then the zone time span is 1920 to 2019 as explained above. In contrast, if the value of year.change is 56, then the zone time span is 1956 to 2055. Therefore, the greater the value of year.change, the further into the future the zone time span will extend. In systems that have computational years that date back many years, a lower value of year.change may be preferable so that a minimal number of records is removed during the initialization process. For example, if there are no computational years in the input data files or master data files prior to 1956, then a value of 56 for year.change may be appropriate and would provide the entity employing the invention the option to wait until 2055 to retire or replace the application. If there are a number of computational years in the input or master data files that are prior to 1928, for example, then a better selection for the value of year.change might be a multiple of 4 that is less than 28 that will minimize the number of records to be removed, while providing sufficient time to retire or replace the existing application.

In the great majority of cases use of the invention will not require the user to make any program changes with the exception of the following: if a program uses a year as a search argument in a table and it is not possible to modify the table keys, then the program is preferably changed to adjust the search argument before a lookup is performed; and, when a program uses the year as information to generate a new datum, such as a part number or a policy number, the program preferably adjusts the year before using it in such a way.

It should be understood that the use of time change interfaces as described herein provides a simple and cost effective solution to the turn-of-the-century problem. In addition, the invention is designed and implemented in a manner that can be easily tested in advance of its actual implementation. Referring back to FIGS. 3A and 3B, a set of test input data may be generated in which all of the dates are in one century. The test data is provided as an input to the application P when the invention is deactivated as in FIG. 3A. The application P processes the test input data resulting in test output data (O). If the same test data is provided as an input to the application P when the invention is activated as shown in FIG. 3B, the resulting output data written to O should be identical to the test output data generated by the application P when the invention is deactivated. If the output data written to output data file (O) in FIG. 3B and the test output data are not identical, the time change interfaces can be investigated as the primary source of error since none of the application code is modified by the invention. Thus, the use of the zone switch in addition to the interface design of the present invention enables the invention to be easily tested.

The invention can be implemented on any general purpose programmable computer such as: IBM 390, IBM 370, DEC VAX, SUN SPARKSTATION, IBM compatible personal computers, and Apple Macintosh computers. In a preferred embodiment, the input date data and the output date data can reside on and can be transferred to and from a variety of devices such as rigid magnetic disks, flexible magnetic media, optical disks, paper tape, punched cards, and remote terminals electronically linked to the computer. When activated the invention preferably becomes an integral component of the machine or computer, coordinating all of its physical actions.

While the invention has been described and illustrated with reference to specific embodiments, those skilled in the art will recognize that modification and variations may be made without departing from the principles of the invention as described hereinabove and set forth in the following claims. For example, though most of the examples presented show simplified batch systems the principles embodied in the invention can be applied to the most complex applications whether batch or online. Also, it should be understood that instead of the local time being adjusted backward to put all dates in the 20th century when converting to zone time, local time can be adjusted forward in time to put all dates in the 21st century. Similarly, zone time may be adjusted backward in time to convert to local time if the local time is adjusted forward in time to convert to zone time. In addition, it should also be understood that the present invention handles turn-of-the-century problems that occur in calendar years other than the year 2000 and the invention can be applied to computer systems at any time prior to year 2000 and can remain in place until the year 2000 plus the year.change. Accordingly, the year 2000 has been used herein for exemplary purposes only.

I claim:

1. A system for processing date-dependent information including dates in at most two centuries wherein the date-dependent information comprises a year field specified in a two-digit format, the system comprising:

a number of local data files having dates represented in local time;

a number of zone data files having dates represented in zone time, the dates represented in zone time being processed by a selected application; and at least one time change means interfaced between the local data files and the zone data files for converting the dates represented in local time to dates represented in zone time and for converting the dates represented in zone time to dates represented in local time.

2. The system of claim 1, wherein the local data files comprise at least one external data file that is generated and modified by a source external to the selected application.

3. The system of claim 1, wherein the selected application comprises a master data file having dates represented in local time and wherein at least one time change means is adapted to interface with the selected application to convert the dates in the master file from local time to zone time.

4. The system of claim 1, further comprising:

a zone switch means interfaced to each time change means for activating and deactivating the time change means.

5. The system of claim 1, wherein the system comprises a plurality of time change means, wherein at least one of the time change means converts only the dates represented in local time to dates represented in zone time and wherein at least one other time change means converts only the dates represented in zone time to dates represented in local time.

6. The system of claim 1, wherein the relative difference between the local time and the zone time is represented by a number of years that is a multiple integer of 4.

7. The system of claim 1, wherein the at least one time change means comprises:

means for accepting a year change value representing the relative difference between the local time and the zone time;

means for generating a complement value representing the difference between one hundred years and the year change value;

means for adjusting each year in the local data files to be input to the selected application by one of the complement value and the year change value so that all of the years input to the selected application are in one century; and means for adjusting each year in the zone data files that have been output from the selected application by one of the complement value and the time change value so that all of the years output from the selected application are represented in local time.

8. A system for processing dates in which the year field of the dates is specified in two-digit format and wherein the dates are in at most two centuries, the system comprising:

an application having a master data file comprising records having dates represented in zone time and having at least one program for processing the records;

a first external data file comprising input date data having dates represented in local time, the first external data file comprising records of which at least some correspond to records of the master data file;

a first time change means interfaced to read from the first external data file and for converting the input date data into zone input date data and for writing the zone input date data to a zone input file, wherein the application reads the zone input date data and processes the zone input date data with corresponding records of the master data file to update the master data file and to generate zone output date data, the zone output date data being written to a zone output file by the application;

a second time change means interfaced to read from the zone output file and for converting the zone output date data into output date data wherein the output date data is represented in local time;

a second external data file interfaced with the second time change means such that the output date data is written to the second external data file; and the program being unaffected by the first time change means and the second time change means.

9. The system of claim 8, wherein the relative difference between dates represented in zone time and the same dates represented in local time is 56 years.

10. The system of claim 8, further comprising:
a source of on-line input date data to be processed by the application and having dates represented in local time:
an output of on-line output date data generated by the application and having dates represented in local time;
wherein the application further comprises a third time change means interfaced to accept an input of the on-line input date data and to output on-line output date data for converting the dates represented in local time to dates represented in zone time, and for converting the dates represented in zone time to dates represented in local time.

11. A method for processing date-dependent information using a computer system; the date-dependent information including dates in at most two centuries wherein the date-dependent information comprises a year field specified in a two-digit format, the method comprising the steps of:
converting input date data to be processed from local time to zone time and defining the input date data so converted as zone input date data;
processing the zone input date data in accordance with an existing application integrated into the computer system to generate zone output date data; and
converting the zone output date data into output date data.

12. The method of claim 11, wherein input date data comprises a number of input years, the step of converting the input date data from local time to zone time comprises the steps of:
defining a time change indicative of a number of years to adjust the local time; and
subtracting the time change from at least some of the input years to generate output years represented in zone time that are processed in accordance with the selected application.

13. The method of claim 12, wherein the zone output date data comprises a number of input years represented in zone time, the step of converting the zone output date data into output date data comprises the step of:
adding the time change to at least some of the input years of the zone output date data to generate output years represented in local time.

14. The method of claim 12, wherein the step of converting the input date data from local time to zone time further comprises the steps of:
generating a complement value representing the difference between one hundred years and the time change;
adding the complement value to each input year that is less than the time change to generate an output year represented in zone time that is processed in accordance with the selected application.

15. The method of claim 12, wherein the step of converting the input date data from local time to zone time further comprises the steps of:
generating a complement value representing the difference between one hundred years and the time change;
adding the complement value to each input year that is less than the time change to generate an output year represented in zone time that is processed in accordance with the selected application; and
wherein the zone output date data comprises a number of input years represented in zone time, the step of converting the zone output date data into output date data comprises the steps of:
adding the time change to at least some of the input years represented in zone time to generate corresponding output years represented in local time; and
subtracting the complement value from each input year represented zone time that is not less than the complement value to generate a corresponding output year represented in local time.

16. The method of claim 11, further comprising the step of:
providing a zone switch for use in activating and deactivating the step of converting the input date data to be processed from local time to zone time and the step of converting the zone output date data into output date data.

17. The method of claim 16, further comprising the step of:
generating test input data comprising dates in one century;
deactivating the steps of converting the date data;
processing the test input data in accordance with the selected application to generate test output data;
activating the steps of converting the date data;
providing the test input data as the input date data whereby corresponding output date data is generated in accordance with the steps set forth in claim 11; and
comparing the output test data and the output date data to verify that the output date data is identical to the output test data.

18. The method of claim 11, wherein the relative difference between the local time and the zone time is 56 years.

19. The method of claim 11, wherein the relative difference between the local time and the zone time is represented by a number of years that is a multiple integer of 4.

20. The method of claim 11, wherein the selected application comprises a master data file having master date data represented in local time, the method further comprising the steps of:
converting the master date data from local time to zone time; and
modifying the master data file based on the zone input date data in accordance with the selected application.

* * * * *